United States Patent
Yuan et al.

(10) Patent No.: US 10,850,399 B2
(45) Date of Patent: Dec. 1, 2020

(54) METHOD AND DEVICE FOR DISPATCHING SERVICE ROBOTS

(71) Applicant: Goertek Inc., Weifang (CN)

(72) Inventors: Shun Yuan, Weifang (CN); Shiyu Li, Weifang (CN)

(73) Assignee: Goertek Inc., Weifang (CN)

( * ) Notice: Subject to any disclaimer, the term of this patent is extended or adjusted under 35 U.S.C. 154(b) by 302 days.

(21) Appl. No.: 15/771,091

(22) PCT Filed: Dec. 8, 2017

(86) PCT No.: PCT/CN2017/115231
§ 371 (c)(1),
(2) Date: May 2, 2018

(87) PCT Pub. No.: WO2018/223638
PCT Pub. Date: Dec. 13, 2018

(65) Prior Publication Data
US 2019/0176337 A1 Jun. 13, 2019

(30) Foreign Application Priority Data
Jun. 6, 2017 (CN) .......................... 2017 1 0417097

(51) Int. Cl.
*B25J 11/00* (2006.01)
*G05D 1/02* (2020.01)
*B25J 9/16* (2006.01)

(52) U.S. Cl.
CPC .......... *B25J 11/008* (2013.01); *B25J 9/1661* (2013.01); *B25J 9/1682* (2013.01);
(Continued)

(58) Field of Classification Search
CPC ...... B25J 11/008; B25J 9/1661; B25J 9/1682; B25J 11/0045; G05D 1/0217; G05D 1/0297; G05D 2201/0217; G06Q 10/0631
See application file for complete search history.

(56) References Cited

U.S. PATENT DOCUMENTS

2015/0148951 A1* 5/2015 Jeon .................... G05D 1/0219
700/248

FOREIGN PATENT DOCUMENTS

| CN | 105446343 A | 3/2016 |
|---|---|---|
| CN | 105892320 A | 8/2016 |

(Continued)

OTHER PUBLICATIONS

International Bureau of WIPO, International Search Report and Written Opinion in Application No. PCT/CN2017/115231 dated Mar. 8, 2018.

*Primary Examiner* — Ian Jen
(74) *Attorney, Agent, or Firm* — LKGlobal | Lorenz & Kopf, LLP

(57) ABSTRACT

A method and device for dispatching service robots are disclosed. The method comprises: receiving a current task in real time, and acquiring effective robots matched with the current task in a working area according to a preset judging rule based on the current task; and selecting an optimum robot from the effective robots according to the current task and a preset dispatching rule, and sending the current task to the optimum robot, to execute a job corresponding to the current task; and adding the current task to a task set corresponding to the optimum robot. The present disclosure solves the problem of the conventional service robots of low work efficiency in use.

12 Claims, 3 Drawing Sheets

---

S11

Receiving a current task in real time, and acquiring effective robots matched with the current task in a working area according to a preset judging rule based on the current task

S12

Selecting an optimum robot from the effective robots according to the current task and a preset dispatching rule, and sending the current task to the optimum robot, to execute a job corresponding to the current task; and adding the current task to a task set corresponding to the optimum robot

(52) U.S. Cl.
CPC ......... *G05D 1/0217* (2013.01); *G05D 1/0297* (2013.01); *B25J 11/0045* (2013.01); *G05D 2201/0217* (2013.01)

(56) References Cited

FOREIGN PATENT DOCUMENTS

| | | | |
|---|---|---|---|
| CN | 105892321 | A | 8/2016 |
| CN | 106355345 | A | 1/2017 |
| CN | 107291078 | A | 10/2017 |
| KR | 20120053096 | A | 5/2012 |
| WO | 2017185993 | A1 | 11/2017 |
| WO | WO-2017185993 | A1 * | 11/2017 ............ B25J 9/1669 |

* cited by examiner

METHOD AND DEVICE FOR DISPATCHING SERVICE ROBOTS

CROSS REFERENCE TO RELATED APPLICATIONS

This Application is a U.S. National Stage entry under 35 U.S.C. § 371 based on International Application No. PCT/CN2017/115231, filed on Dec. 8, 2017, which was published under PCT Article 21(2) and which claims priority to Chinese Patent Application No. 201710417097.X, filed on Jun. 6, 2017 which are all hereby incorporated herein by reference in their entirety.

TECHNICAL FIELD

This Application pertains to the technical field of smart devices, and particularly relates to a method and device for dispatching service robots.

BACKGROUND

As a new member to the robot family, the service robot includes the service robot in specialized fields and the service robot for individual/domestic use. Service robots are widely used in maintenance, reparation, transportation, cleaning, safety guard, rescuing and monitoring, etc.

When one service robot is working singly in a working area, the service robot can execute tasks according to a preset program to satisfy the demands. However, if there is a plurality of service robots in a working area, it is a technical problem that a person skilled in the art must solve how to improve the work efficiency of the plurality of service robots. In addition, other objects, desirable features and characteristics will become apparent from the subsequent summary and detailed description, and the appended claims, taken in conjunction with the accompanying drawings and this background.

SUMMARY

This Application provides a method and device for dispatching service robots, to solve the problem that the work efficiency of conventional service robots is low and cannot satisfy the demands.

According to an aspect of this Application, there is provided a method for dispatching service robots, comprising:

receiving a current task in real time, and acquiring effective robots matched with the current task in a working area according to a preset judging rule based on the current task;

selecting an optimum robot from the effective robots according to the current task and a preset dispatching rule, and sending the current task to the optimum robot, to execute a job corresponding to the current task; and adding the current task to a task set corresponding to the optimum robot.

According to another aspect of this Application, there is provided a device for dispatching service robots, comprising:

a judging module, for receiving a current task in real time, and acquiring effective robots matched with the current task in a working area according to a preset judging rule based on the current task; and a dispatching module, for, selecting an optimum robot from the effective robots according to the current task and a preset dispatching rule, and sending the current task to the optimum robot, to execute a job corresponding to the current task; and adding the current task to a task set corresponding to the optimum robot.

According to another aspect of this Application, there is provided a server comprising a processor and a memory, wherein the memory stores machine executable instruction codes, and the processor communicates with the memory, and reads and executes the instruction codes stored in the memory, to realize a method for dispatching service robots which comprising the steps of:

receiving a current task in real time, and acquiring effective robots matched with the current task in a working area according to a preset judging rule based on the current task;

selecting an optimum robot from the effective robots according to the current task and a preset dispatching rule, and sending the current task to the optimum robot to execute a job corresponding to the current task; and adding the current task to a task set corresponding to the optimum robot.

The advantageous effects of this Application are as follows. According to the method and device for dispatching service robots of this Application, a current task is received in real time, and effective robots matched with the current task in a working area are acquired according to a preset judging rule based on the current task; according to the current task and a preset dispatching rule, an optimum robot is selected from the effective robots and sent the current task to execute a job corresponding to the current task; and the current task is added to a task set corresponding to the optimum robot. Therefore, the robots can be dispatch when a plurality of service robots are simultaneously working to assign the current task to the selected optimum robot, thereby improving the service efficiency of the robots and satisfying the actual demands.

BRIEF DESCRIPTION OF DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the Application and uses of the invention. Furthermore, there is no intention to be bound by any theory presented in the preceding background of the invention or the following detailed description.

In the prior art, the operating path design of robots is mainly made with respect to a single robot. For example, the tasks of meal delivering robots are mainly delivering a meal and recovering the leftovers and wastes on the dining tables. When the tasks to be executed of a plurality of meal delivering robots are set according to the operating path of a single meal delivering robot, the work efficiency is low. For example, a meal delivering robot returns to a fixed location after completing the meal delivering, and it carries nothing when it comes back, although at this point there are leftovers and wastes to be carried back at other locations. If the dispatching of meal delivering robots is not improved in such a case, it will cause the waste of the robots, and cannot satisfy the demand of fully taking advantage of the service robots.

Figure 1:
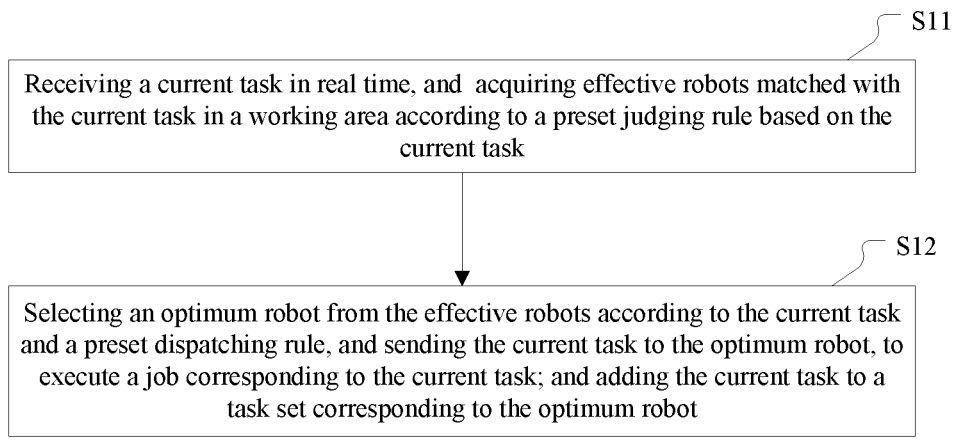
FIG. 1 is a flow chart of a method for dispatching service robots in accordance with a non-limiting embodiment of this Application.

In order to solve this problem, this Application provides a method for dispatching service robots. FIG. 1 is a flow chart of a method for dispatching service robots in accordance with an embodiment of this Application. As shown in FIG. 1, the method comprises:

Step S11, receiving a current task in real time, and acquiring effective robots matched with the current task in a working area according to a preset judging rule based on the current task; and Step S12, selecting an optimum robot (namely, the service robot to execute a task) from the effective robots according to the current task and a preset dispatching rule, and sending the current task to the optimum robot, to execute a job corresponding to the current task; and adding the current task to a task set corresponding to the optimum robot.

As can be seen from FIG. 1, in the method for dispatching service robots of this Application, effective robots matched with the current task are screened out, then an optimum robot is selected from the effective robots according to the current task and a preset dispatching rule, and the current task is sent to the optimum robot to execute. In such a manner, with respect to each received task, it can be dynamically assigned to an appropriate robot according to the state of the robots in the working area, thereby effectively improving the service efficiency of the robots and satisfying the demand of fully taking advantage of the service robots.

Figure 2:
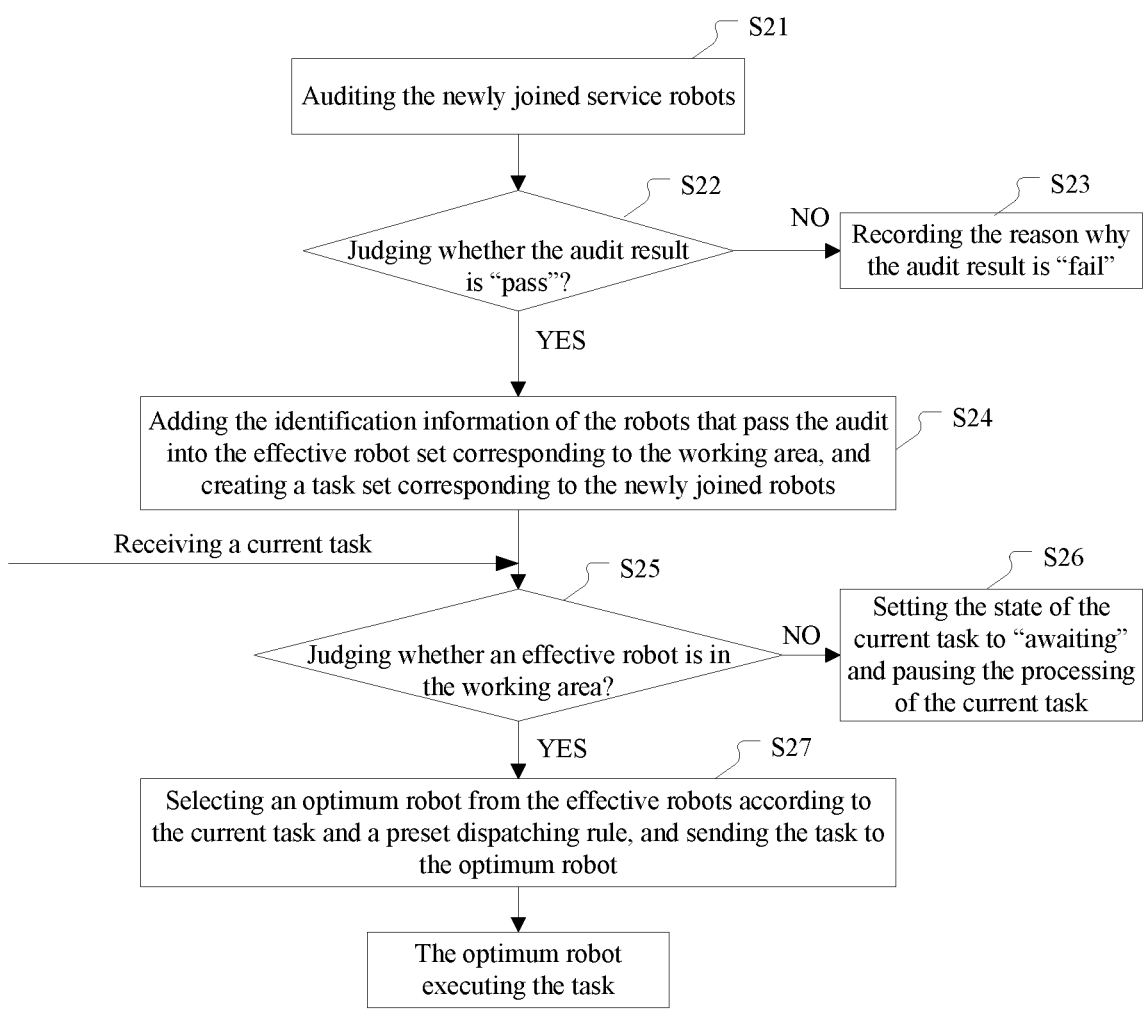
FIG. 2 is a flow chart of a method for dispatching service robots in accordance with another non-limiting embodiment of this Application.

FIG. 2 is a flow chart of a method for dispatching service robots in accordance with another embodiment of this Application. As shown in FIG. 2, the method for dispatching service robots comprises the following steps:

Step S21: auditing a newly joined service robot.

Herein, before the service robots are dispatched, the registration request of a newly joined robot is received first. The registration request comprises identification information of robot, such as serial number, equipment model, function, carrying capacity and battery capacity of the robot. In practical applications, a front end interface may be provided for adding the information of the new robot by the user.

Specifically, the newly joined robot may be audited according to the demand. For example, the demand is a meal delivering robot with carrying capacity of 20 kg, and if the current robot to be audited is a floor sweeping robot, the audit result is "fail". As another example, if the current robot to be audited is a meal delivering robot but its carrying capacity is only 5 kg, the audit result may also be "fail".

Step S22: judging whether the audit result is "pass", and if no, executing Step S23; if yes, executing Step S24.

Step S23: recording the reason that the audit result is "fail". In the above example, the reasons such as non-matched function or non-matched carrying capacity will be recorded.

Step S24: adding the identification information of the robot passing the audit into the effective robot set corresponding to the working area, and creating a task set for the newly joined robot for storing the tasks when it is actually assigned a task.

It should be noted that, in an embodiment, the task set herein may be in the form of a task queue which is sequenced according to the order of task receiving time, and the service robots successively execute the sequenced tasks.

In addition, the task queue is saved in both the dispatching device implementing the method of this Application and the service robots. The task queue is periodically synchronized. The dispatching device saves the task queues of all of the service robots, and each service robot saves its own task queue.

S25: judging whether an effective robot is in the working area, namely, judging whether an effective robot matched with the current task is in the working area according to the preset judging rule based on the current task, and if yes executing Step S27; if no executing Step S26.

All of the robots in the effective robot set have been determined as trouble-free and can process the current task.

The effective robot set is particularly obtained in the following manner: acquiring values of a first preset indicator corresponding to trouble-free robots in the working area, wherein the first preset indicator comprises one or more of robot size, carrying capacity, function and remaining battery capacity; and according to results of comparing the values of the first preset indicator corresponding to the respective trouble-free robots with the preset judging rule indicating a matching condition, screening out effective robots matched with the current task to form an effective robot set.

In practical applications, the step of judging whether an effective robot is in the working area may be implemented by judging whether the identifier quantity in the effective robot set is greater than 0. If not greater than 0, there is no effective robot; if greater than 0, there is an effective robot. When a current task is assigned, all of the robots in the working area are probably executing a task, namely, the identifier quantity of the robots in the effective robot set may be 0, the effective robot set should be judged first, and different processing will be executed based on the judging result.

Herein the preset judging rule may be a carrying capacity-based rule. For example, the current task is meal delivering and the weight is 3 kg, so according to the carrying capacity-based rule, all trouble-free idle robots that currently can carry a weight of greater than or equal to 3 kg will be the effective robots. As another example, the preset judging rule may be a function-based rule. Namely, all trouble-free idle robots having the function required by the current task (such as floor sweeping, meal delivering, dish collecting and table wiping) will be screened out as the effective robots. In other embodiments of this Application, the preset judging rule may be other rules. It should be set according to the actual demands and is not limited herein.

In practice, the step of judging whether there is an effective robot matched with the current task may also be implemented by judging the remaining battery capacity of the respective robots in the working area. For example, values of remaining battery capacity of the respective robots in the working area are acquired in real time, and it is judged whether the remaining battery capacity of a robot is less than or equal to a preset battery capacity threshold. If yes, the robot has an insufficient battery capacity and cannot be used to execute any work. The robot will be notified to go to the nearest charging pile to charge, and the identification information of the robot to be charged will be deleted from the effective robot set.

It should be noted that, after completing the charging, the respective robots initiatively report their remaining battery capacity information. The dispatching device adds all robots with a remaining electricity capacity greater than the preset threshold into the effective robot set according to the received battery capacity information of the respective robots. Alternatively, the dispatching device periodically acquires the battery capacity information of the robots going to the charging piles, and adds the robots into the effective robot set when the charging is completed. Herein, the preset threshold may be set based on the lowest battery capacity to complete at least one task by the robot and according to experience.

Step S26: setting the state of the current task to "awaiting" and pausing the processing of the current task.

Step S27: selecting an optimum robot from the effective robots according to the current task and a preset dispatching rule, and sending the task to the optimum robot.

How to determine the optimum robot to execute a task is the key point of this Application, because it directly influences the effect of dispatching and service efficiency of the robots.

The present embodiment provides a particular mode of determining the optimum robot to execute a task, specifically, acquiring values of a second preset indicator corresponding to the effective robots, wherein the second preset indicator comprises one or more of a current location indicator, a running state indicator and an indicator of task quantity in the task set; and according to the current task and a score value-based dispatching rule included in the preset dispatching rule, selecting the effective robot having the highest sum of the scores among the effective robots as the optimum robot. The sum of the scores of the effective robots is obtained by adding the score values after scoring the acquired values of the second preset indicators corresponding to the respective effective robots according to a preset scoring rule.

Such a mode comprehensively takes into account various current states of the effective robots, thereby ensuring that the dispatching result is more practical and can improve the efficiency of the service robots, and achieve the object of fully taking advantage of the service robots.

As an example, the working area is a restaurant, the service robots in the working area are a robot 1, a robot 2 and a robot 3, and the current task is delivering a meal to table No. 5.

The values of the second preset indicator corresponding to the three robots are acquired according to the mode of the present embodiment. The second preset indicator here comprises one or more of a current location indicator, a running state indicator and an indicator of task quantity in the task set. As an example, the case that the second preset indicator merely comprises the current location indicator will be described first. The current location of the robot 1 is 20 steps away from table No. 5, the current location of the robot 2 is 35 steps away from table No. 5, and the current location of the robot 3 is 45 steps away from table No. 5. The three robots are scored based on these values. The scoring rule may be that, 10 points will be given if the location is 5 steps or less away from the target service location, 8 points if 5 steps to 20 steps away, and so on. The scores of the respective robots with the current location indicator can be calculated out. It is assumed that the score of the robot 1 is 8 points, the score of the robot 2 is 6 points, and the score of the robot 3 is 3 points. Thus if the scores are sequenced according to the score value-based dispatching rule included in the preset dispatching rule, it can be determined that the optimum robot is the robot 1.

In the same manner, when the second preset indicator comprises three indicators, namely, the current location indicator, the running state indicator and the indicator of task quantity in the task set, the scores of the respective robots are calculated respectively with respect to each indicator, and then the scores are added and the sums obtained are sequenced, thereby the optimum robot can be determined. Herein, the running state indicator may further include a carrying capacity indicator and an operating path indicator, such as the process of going to the table and executing the task, or the process of returning to a fixed location after the task is executed.

In addition, in other embodiments of this Application, the preset dispatching rule may also comprise an efficiency-based dispatching rule. According to the efficiency-based dispatching rule, the robots are evaluated according to the efficiencies with which the effective robots execute tasks, such as the speed at which the robots walk to the task target location and the speed of executing the actions indicated in the tasks, and the effective robot having the highest efficiency will be selected as the optimum robot, and the task will be sent to this optimum robot.

The preset dispatching rule may also comprise a shortest path-based dispatching rule. Specifically, a walking path of the effective robot to execute the current task is generated according to the current task and the electronic map of the working area. In the process that the effective robot walks to a target service location, executes the task and returns to a fixed location according to a return path, it is judged whether a new task is received. If there is a new task and the target service location indicated by the new task falls within the range of the return path of the effective robot that is executing the current task, the effective robot will be named as the optimum robot of the new task directly. If the target service location indicated by the new task simultaneously falls within the ranges of the return paths of two or more effective robots, the distances from the effective robots to the target service location will be further calculated, and the effective robot with the shortest distance will be selected as the optimum robot.

For example, the working area of the robots of the present embodiment is a restaurant, and the robots 1 and 2 are both delivering a meal. After the meal delivering is completed, the robots 1 and 2 return according to the return paths, and both the robots 1 and 2 will pass table No. 5 on the way back to the fixed location. At this point, the dispatching device receives a new task of collecting leftovers and wastes at dining table No. 5. The dispatching device may, according to the current locations of the robots 1 and 2, calculate out the distances of the robots 1 and 2 from dining table No. 5, select the robot closer to dining table No. 5 as the optimum robot, and notify the optimum robot to directly go to dining table No. 5 to collect leftovers and wastes rather than directly return to the fixed location, thereby improving the service efficiency of the robots.

It should be noted that, when the current task is sent to the optimum robot, the dispatching device will add the current task into the task set maintained by the dispatching device to monitor the executing of the task. In addition, the above particular dispatching rules are merely illustrative, and in practice one may define other dispatching rules according to the demands, which is not limited herein.

After the optimum robot receives the current task, it will execute the job indicated by the current task.

In addition, in order to prevent the robots from encountering or even colliding to damage themselves in the process of executing tasks, in the present embodiment, according to an electronic map corresponding to the working area, the values of the current location indicators and movement speeds of the respective robots that are acquired in real time corresponding to the respective robots in the working area, judging whether there is a risk of encountering of two specified robots. When it is determined that there is a risk of encountering, the corresponding robots are notified to avoid according to a preset avoiding strategy. The preset avoiding strategy comprises: an idle robot giving way to a robot executing a task, and/or, a robot far from an encountering location giving way to a robot close to the encountering location.

Particularly, in practical applications, the service robots will report their own state information to the dispatching device periodically or in real time, and the dispatching device will calculate out whether there is a risk of encountering of two specified robots and where they may encounter according to the information reported by the service robots and an electronic map, and then notify the corresponding robots to avoid according to a preset avoiding strategy.

After the task is completed, the dispatching device receives the execution result information sent by the service robot, deletes the task in the task set corresponding to the effective robot according to the execution result information, and notifies the effective robot to delete the task.

Additionally, considering that in practical applications the service may be cancelled, for example, the customer orders the meal and then cancels it, the method of the present embodiment further comprises the steps of: receiving an execution cancelling instruction which is sent when a service is cancelled, finding the corresponding task and the robot that the task is sent to according to a task identifier in the execution cancelling instruction, deleting the task from the task set corresponding to the robot that is found, and notifying the robot to cancel the execution of the job corresponding to the task. In such a manner, the dispatching device may cancel the task that is not executed as required, to avoid useless work and save electricity in the robot.

In some embodiments of this Application, when it is determined that a task set corresponding to a robot has no task according to task execution state of a robot acquired in real time, a cruising path is generated according to the electronic map corresponding to the working area and sent to the robot, and the robot is notified to turn on a cruising mode and cruise in the working area according to the cruising path. Thereby, the robot can provide service to customers at any moment, and the service efficiency is improved.

Figure 3:
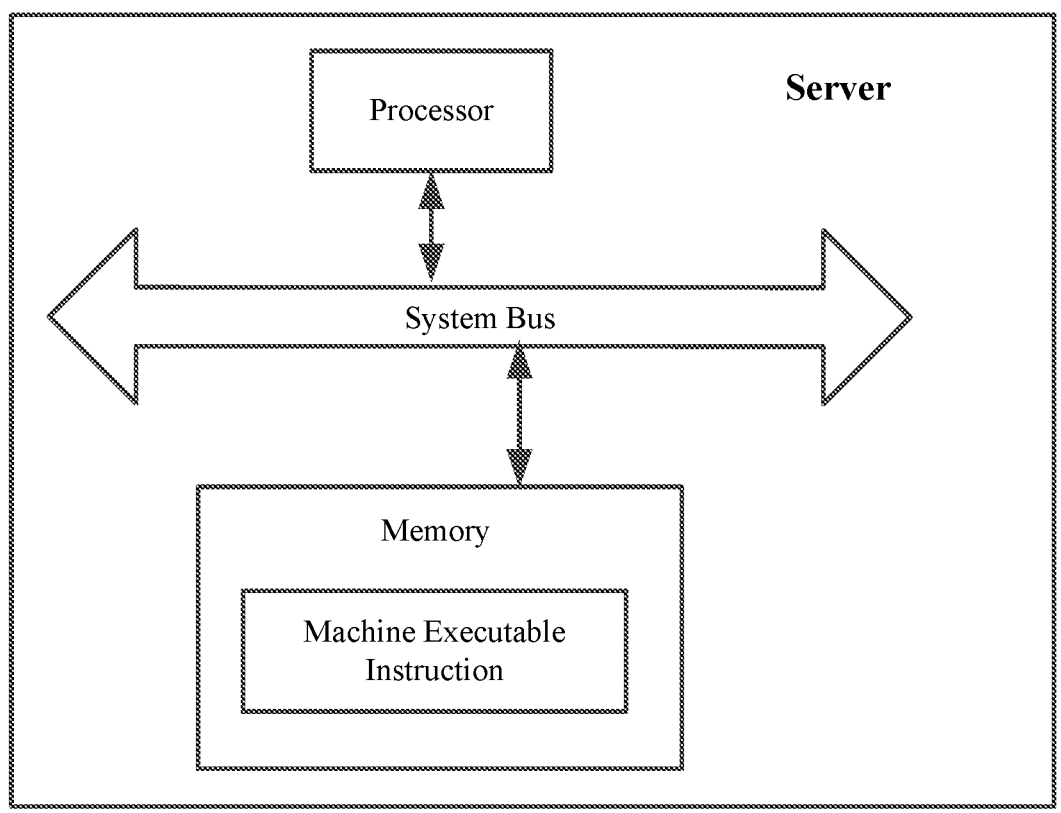
FIG. 3 is a structural block diagram of a server in accordance with a non-limiting embodiment of this Application.

FIG. 3 shows a hardware structural diagram of the server of this Application. Besides the processor and the memory shown in FIG. 3, according to the practical functions of the server, the device may also comprise other hardware, which is not discussed here in detail.

In FIG. 3, the memory stores machine executable instruction codes.

The processor communicates with the memory, reads and executes the instruction codes stored in the memory, to implement the operations of dispatching the service robot that are disclosed in the above examples of this Application.

Herein, the memory may be any electronic, magnetic, optical or other physical storage devices, and may contain or store information, such as executable instructions, data and so on. For example, the machine readable storage medium may be: RAM (Radom Access Memory), a volatile memory, a nonvolatile memory, a flash memory, a storage driver (such as a hard disk drive), a solid state disk, any type of memory discs (such as an optical disk, DVD and so on), or similar storage media, or a combination thereof.

Figure 4:
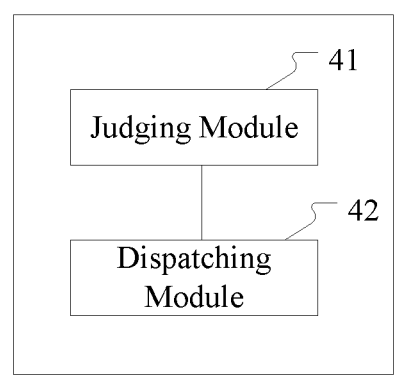
FIG. 4 is a functional block diagram of a device for dispatching service robots in accordance with a non-limiting embodiment of this Application.

Referring to FIG. 4, this Application further provides a device for dispatching service robots, comprising:

a judging module 41, for receiving a current task in real time, and acquiring effective robots matched with the current task in a working area according to a preset judging rule based on the current task; and a dispatching module 42, for, according to the current task and a preset dispatching rule, selecting an optimum robot from the effective robots, and sending the current task to the optimum robot, to execute a job corresponding to the current task; and adding the current task to a task set corresponding to the optimum robot.

Figure 5:
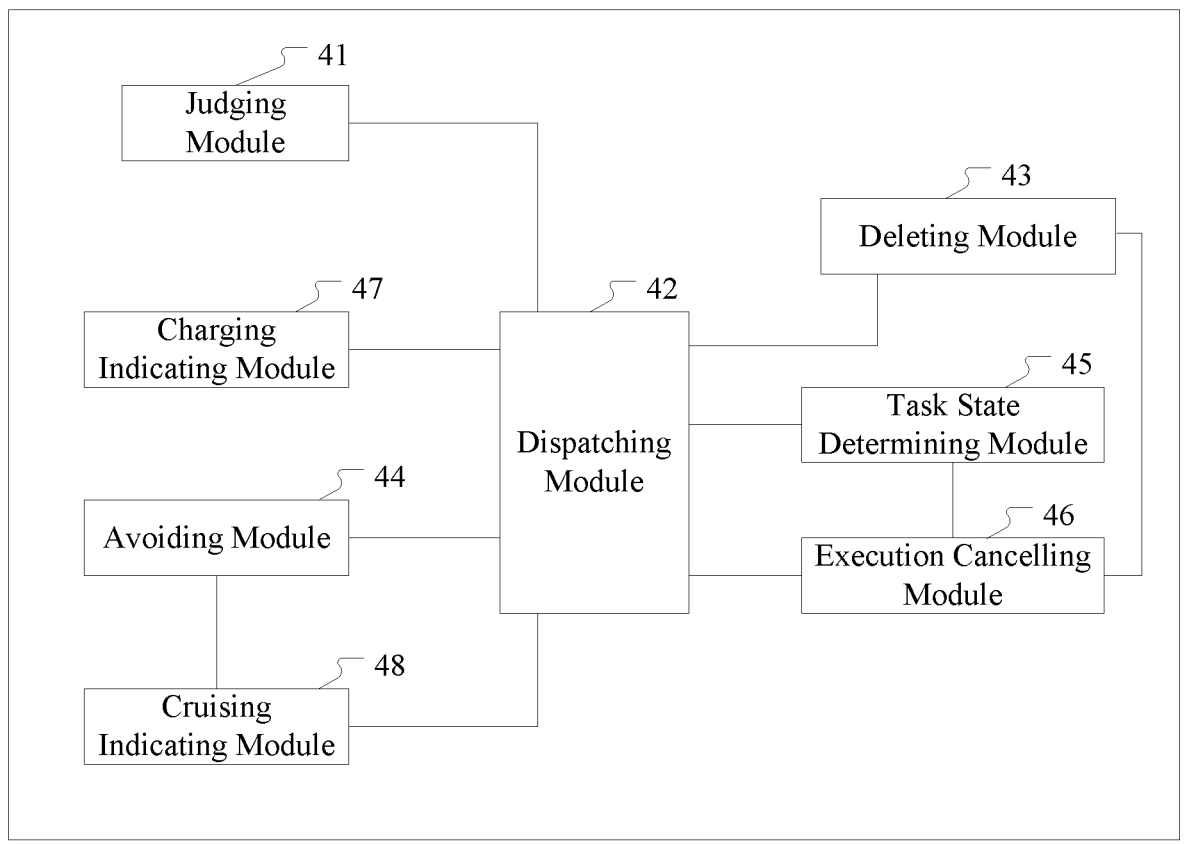
FIG. 5 is a functional block diagram of a device for dispatching service robots in accordance with another non-limiting embodiment of this Application.

This Application further provides a device for dispatching service robots. As shown in FIG. 5, the dispatching device comprises: a judging module 41, a dispatching module 42, a deleting module 43, an avoiding module 44, a task state determining module 45, an execution cancelling module 46, a charging indicating module 47 and a cruising indicating module 48.

In the present embodiment, the judging module 41 is particularly for acquiring values of a first preset indicator corresponding to trouble-free robots in the working area, wherein the first preset indicator comprises one or more of robot size, carrying capacity, function and remaining battery capacity; and according to results of comparing the values of the first preset indicator corresponding to the respective trouble-free robots and the preset judging rule indicating a matching condition, screening out effective robots matched with the current task.

The dispatching module 42 is particularly for acquiring values of a second preset indicator corresponding to the effective robots, wherein the second preset indicator comprises one or more of a current location indicator, a running state indicator and an indicator of a task quantity in the task set; and according to the current task and a score value-based dispatching rule included in the preset dispatching rule, selecting the effective robot that has having the highest sum of the scores among the effective robots as the optimum robot. The sum of the scores of the effective robots is obtained by adding the score values after scoring the acquired values of the second preset indicators corresponding to the respective effective robots according to a preset scoring rule.

In the present embodiment, the deleting module 43 is for acquiring execution result information after the respective effective robots in the working area completed the jobs corresponding to the tasks, deleting the task in the task set corresponding to the effective robots according to the execution result information, and notifying the effective robots.

The avoiding module 44 is for, according to an electronic map corresponding to the working area, the values of the current location indicator corresponding to the respective robots in the working area and movement speeds of the respective robots that are acquired in real time, judging whether there is a risk of encountering of two specified robots, and when it is determined that there is a risk of encountering, notifying the corresponding robots to avoid according to a preset avoiding strategy; wherein the preset avoiding strategy comprises: an idle robot giving way to a robot executing a task, and/or, a robot far from an encountering location giving way to a robot close to the encountering location.

The task state determining module 45 is for, when the current task is received, judging whether the quantity of effective robot identifiers in the effective robot set corresponding to the working area is not greater than 0, and if not greater than 0, setting the state of the current task to "awaiting" and pausing the processing of the current task; if greater than 0, according to the current task and a preset dispatching rule, selecting an optimum robot from the effective robots, and acquiring effective robots matched with the current task in a working area according to a preset judging rule.

The execution cancelling module 46 is for, receiving an execution cancelling instruction which is sent when a service is cancelled, finding the corresponding task and the robot that the task is sent to according to a task identifier in the execution cancelling instruction, deleting the task from the task set corresponding to the robot that is found, and notifying the robot to cancel the execution of the job corresponding to the task.

The charging indicating module 47 is for, according to values of remaining battery capacity of the respective robots in the working area acquired in real time, judging the remaining battery capacity of the respective robots, and when the remaining battery capacity of a robot is less than or equal to a preset battery capacity threshold, notifying the robot to go to the nearest charging pile to charge, and deleting the identification information of the robot to be charged from the effective robot set.

The cruising indicating module 48 is for, when it is determined that a task set corresponding to a robot has no task according to task execution state of a robot acquired in real time, generating a cruising path according to the electronic map corresponding to the working area, sending the cruising path to the robot, and notifying the robot to turn on a cruising mode and cruise in the working area according to the cruising path.

Regarding the device embodiments, as they substantially correspond to the method embodiments, the related parts can refer to the description of the method embodiments. The description of the device embodiments above is merely illustrative, and a person skilled in the art may select part of or all of their modules according to the actual demands to realize the objects of the technical solution of the present embodiment. A person skilled in the art can understand and implement the technical solution without paying creative work.

It should be noted that, in this Application, relation terms such as "first" and "second" are merely used to distinguish one entity or operation from another entity or operation, and they do not necessarily require or imply that these entities or operations actually have such a relation or order. The terms "comprise", "include" or any other variants thereof are intended to cover nonexclusive inclusion, so that processes, methods, articles or devices that comprise a series of elements do not only comprise those elements, but also comprise other elements that are not explicitly listed, or further comprise elements that are intrinsic to such processes, methods, articles or devices. Where there is no further limitation, the statement "comprises a . . . " does not exclude that there exist additional elements of the same kind in the processes, methods, articles or devices that comprise the element.

The above merely describes specific embodiments of this Application. With the teaching of this Application, a person skilled in the art can make other modifications or variations on the basis of the above embodiments. A person skilled in the art should appreciate that, the specific description above is only for the purpose of better explaining this Application, and the protection scope of this Application should be subject to the protection scope of the claims.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method for dispatching service robots, comprising the steps of:
   receiving a current task in real time, and acquiring effective robots matched with the current task in a working area according to a preset judging rule based on the current task;
   selecting an optimum robot from the effective robots according to the current task and a preset dispatching rule, and sending the current task to the optimum robot to execute a job corresponding to the current task; and
   adding the current task to a task set corresponding to the optimum robot;
   wherein the preset dispatching rule comprises an efficiency-based dispatching rule; and
   the efficiency-based dispatching rule refers to:
      evaluating the robots according to efficiencies with which the effective robots execute tasks and the speeds of executing actions indicated in the tasks, and
      selecting the effective robot having the highest efficiency as the optimum robot.

2. The method according to claim 1, wherein the step of acquiring effective robots matched with the current task in a working area according to a preset judging rule comprises the steps of:
   acquiring values of a first preset indicator corresponding to respective trouble-free robots in the working area, wherein the first preset indicator comprises one or more of robot size, carrying capacity, function and remaining battery capacity; and
   according to results of comparing the value of the first preset indicator corresponding to the respective trouble-free robots with the preset judging rule indicating a matching condition, screening out the effective robots matched with the current task;
   wherein the step of selecting an optimum robot from the effective robots according to the current task and a preset dispatching rule comprises the steps of:
   acquiring values of a second preset indicator corresponding to the effective robots, wherein the second preset indicator comprises one or more of current location indicator, running state indicator and indicator of task quantity in the task set; and
   according to the current task and a score value-based dispatching rule included in the preset dispatching rule, selecting an effective robot having a highest sum of the scores among the effective robots as the optimum robot; wherein the sum of the scores of the effective robots is obtained by scoring the acquired values of the second preset indicators that are corresponding to the respective effective robots according to a preset scoring rule and then summating the score values.

3. The method according to claim 1, further comprising:
acquiring execution result information after the respective effective robots in the working area executed the jobs corresponding to the tasks, deleting the task in the task set corresponding to the effective robots according to the execution result information, and notifying the effective robots; and
according to an electronic map corresponding to the working area, the values of the current location indicators and movement speeds of the respective robots that are acquired in real time corresponding to the respective robots in the working area, judging whether there is a risk of encountering of two specified robots, and when it is determined that there is a risk of encountering, notifying the corresponding robots to avoid according to a preset avoiding strategy; wherein the preset avoiding strategy comprises: an idle robot giving way to a robot executing a task, and/or, a robot far from an encountering location giving way to a robot close to the encountering location.

4. The method according to claim 2, further comprising:
judging whether the quantity of effective robot identifiers in the effective robot set is not greater than 0, and if not greater than 0, setting the state of the current task to be waiting and pausing the processing of the current task; and if greater than 0, according to the current task and a preset dispatching rule, selecting an optimum robot from the effective robots;
and,
receiving an execution cancelling instruction which is sent when a service is cancelled, according to a task identifier in the execution cancelling instruction, finding the corresponding task and the robot that the task is sent to, deleting the task from the task set corresponding to the robot that is found, and notifying the robot to cancel the execution of the job corresponding to the task;
and,
according to values of remaining battery capacity of the respective robots in the working area acquired in real time, judging the remaining battery capacity of the respective robots, and when the remaining battery capacity of a robot is less than or equal to a preset battery capacity threshold, notifying the robot to go to the nearest charging pile to charge, and deleting the identification information of the robot to be charged from the effective robot set.

5. The method according to claim 1, further comprising:
according to task execution state of a robot acquired in real time, when it is determined that a task set corresponding to a robot has no task, generating a cruising path according to an electronic map corresponding to the working area, sending the cruising path to the robot, and notifying the robot to turn on a cruising mode and cruise in the working area according to the cruising path.

6. The method according to claim 1, wherein the preset dispatching rule comprises a shortest path-based dispatching rule; and
the shortest path-based dispatching rule refers to:
generating a walking path of the effective robot to execute the current task according to the current task and the electronic map of the working area;
judging whether a new task is received in the process that the effective robot walks to a target service location, executes the task and returns to a fixed location according to a return path; and
if there is a new task and the target service location indicated by the new task falls within the range of the return path of the effective robot that is executing the current task, selecting the effective robot as the optimum robot of the new task directly, and if the target service location indicated by the new task simultaneously falls within the ranges of the return paths of two or more effective robots, calculating the distances from the effective robots to the target service location furtherly and selecting the effective robot with the shortest distance as the optimum robot.

7. A server comprising a processor and a memory, wherein the memory stores machine executable instruction codes, and the processor communicates with the memory, and reads and executes the instruction codes stored in the memory, to realize a method for dispatching service robots which comprising the steps of:
receiving a current task in real time, and acquiring effective robots matched with the current task in a working area according to a preset judging rule based on the current task;
selecting an optimum robot from the effective robots according to the current task and a preset dispatching rule, and sending the current task to the optimum robot to execute a job corresponding to the current task; and
adding the current task to a task set corresponding to the optimum robot;
wherein the preset dispatching rule comprises an efficiency-based dispatching rule; and
the efficiency-based dispatching rule refers to:
evaluating the robots according to efficiencies with which the effective robots execute tasks and the speeds of executing actions indicated in the tasks, and
selecting the effective robot having the highest efficiency as the optimum robot.

8. The server according to claim 7, wherein the step of acquiring effective robots matched with the current task in a working area according to a preset judging rule comprises the steps of:
acquiring values of a first preset indicator corresponding to respective trouble-free robots in the working area, wherein the first preset indicator comprises one or more of robot size, carrying capacity, function and remaining battery capacity; and
according to results of comparing the value of the first preset indicator corresponding to the respective trouble-free robots with the preset judging rule indicating a matching condition, screening out the effective robots matched with the current task;
wherein the step of selecting an optimum robot from the effective robots according to the current task and a preset dispatching rule comprises the steps of:
acquiring values of a second preset indicator corresponding to the effective robots, wherein the second preset indicator comprises one or more of current location indicator, running state indicator and indicator of task quantity in the task set; and
according to the current task and a score value-based dispatching rule included in the preset dispatching rule, selecting an effective robot having a highest sum of the scores among the effective robots as the optimum robot; wherein the sum of the scores of the effective robots is obtained by scoring the acquired values of the second preset indicators that are corresponding to the respective effective robots according to a preset scoring rule and then summating the score values.

9. The server according to claim 7, the method for dispatching service robots further comprising:

acquiring execution result information after the respective effective robots in the working area executed the jobs corresponding to the tasks, deleting the task in the task set corresponding to the effective robots according to the execution result information, and notifying the effective robots; and according to an electronic map corresponding to the working area, the values of the current location indicators and movement speeds of the respective robots that are acquired in real time corresponding to the respective robots in the working area, judging whether there is a risk of encountering of two specified robots, and when it is determined that there is a risk of encountering, notifying the corresponding robots to avoid according to a preset avoiding strategy; wherein the preset avoiding strategy comprises: an idle robot giving way to a robot executing a task, and/or, a robot far from an encountering location giving way to a robot close to the encountering location.

10. The server according to claim 8, the method for dispatching service robots further comprising:

judging whether the quantity of effective robot identifiers in the effective robot set is not greater than 0, and if not greater than 0, setting the state of the current task to be waiting and pausing the processing of the current task; and if greater than 0, according to the current task and a preset dispatching rule, selecting an optimum robot from the effective robots;

and, receiving an execution cancelling instruction which is sent when a service is cancelled, according to a task identifier in the execution cancelling instruction, finding the corresponding task and the robot that the task is sent to, deleting the task from the task set corresponding to the robot that is found, and notifying the robot to cancel the execution of the job corresponding to the task;

and, according to values of remaining battery capacity of the respective robots in the working area acquired in real time, judging the remaining battery capacity of the respective robots, and when the remaining battery capacity of a robot is less than or equal to a preset battery capacity threshold, notifying the robot to go to the nearest charging pile to charge, and deleting the identification information of the robot to be charged from the effective robot set.

11. The server according to claim 7, the method for dispatching service robots further comprising:

according to task execution state of a robot acquired in real time, when it is determined that a task set corresponding to a robot has no task, generating a cruising path according to an electronic map corresponding to the working area, sending the cruising path to the robot, and notifying the robot to turn on a cruising mode and cruise in the working area according to the cruising path.

12. The server according to claim 7, wherein the preset dispatching rule comprises a shortest path-based dispatching rule; and the shortest path-based dispatching rule refers to:

generating a walking path of the effective robot to execute the current task according to the current task and the electronic map of the working area;

judging whether a new task is received in the process that the effective robot walks to a target service location, executes the task and returns to a fixed location according to a return path; and if there is a new task and the target service location indicated by the new task falls within the range of the return path of the effective robot that is executing the current task, selecting the effective robot as the optimum robot of the new task directly, and if the target service location indicated by the new task simultaneously falls within the ranges of the return paths of two or more effective robots, calculating the distances from the effective robots to the target service location furtherly and selecting the effective robot with the shortest distance as the optimum robot.

* * * * *